United States Patent [19]
Lizotte

[11] Patent Number: 5,341,588
[45] Date of Patent: Aug. 30, 1994

[54] PORTABLE ICE FISHING HUT

[76] Inventor: Quentin Lizotte, 104 Lockerill Cres, Fort McMurray, Alberta, Canada, T9K 2J3

[21] Appl. No.: 125,762

[22] Filed: Sep. 24, 1993

[51] Int. Cl.$^5$ ............................................. A01M 31/00
[52] U.S. Cl. .......................................... 43/1; 135/901; 280/19
[58] Field of Search .................. 43/1; 135/901; 52/63, 52/263; 297/217; 280/19, 28, 28.12

[56] References Cited

U.S. PATENT DOCUMENTS

| | | | |
|---|---|---|---|
| 2,473,076 | 6/1949 | Scheibner | 135/901 |
| 2,546,588 | 3/1951 | Ellis | 43/1 |
| 3,507,293 | 4/1970 | Bray | 135/901 |
| 3,826,270 | 7/1974 | Hentges | 135/901 |
| 3,971,395 | 7/1976 | Lipinski | 135/901 |
| 4,186,507 | 2/1980 | Stinnett | 43/1 |
| 4,239,247 | 12/1980 | Hinz | 135/901 |
| 4,870,984 | 10/1989 | Roth | 52/63 |
| 5,271,423 | 12/1993 | Eychaner | 135/901 |

Primary Examiner—Kurt C. Rowan
Attorney, Agent, or Firm—Hugh E. Smith

[57] ABSTRACT

An ice fish house readily transportable comprising, in combination a housing base having a horizontal central platform, a pair of similarly shaped side platforms, parallel hinges coupling the central platform and the side platforms with the side platforms being positionable between a deployed orientation wherein the side platforms extend in a horizontal plane with the central plane and a collapsed orientation wherein the side platforms extend upwardly at about 90 degrees with respect to the central platform, walls extending vertically from the side platforms; a frame fabricated of vertical rods coupled at their lower edges to the walls, two parallel lengths of horizontal rods couplable to the vertical rods, a single horizontal length of rods centrally located between the lengths of horizontal rods but at an elevated location, a plurality of angled rods coupling the single length of rods and two parallel lengths of rods, and coupling elements separably joining the lengths of rods and the angled rods; sheet material covering the housing base and frame for forming an interior space therebetween; and a pair of parallel skids positioned beneath the central platform, a plurality of holes through each skid in axially aligned pairs, a plurality of tubular housing coupling each axially aligned pair of holes, a support pole extending through each housing and extending axially therefrom a distance to support the side platforms when in the deployed orientation.

8 Claims, 4 Drawing Sheets

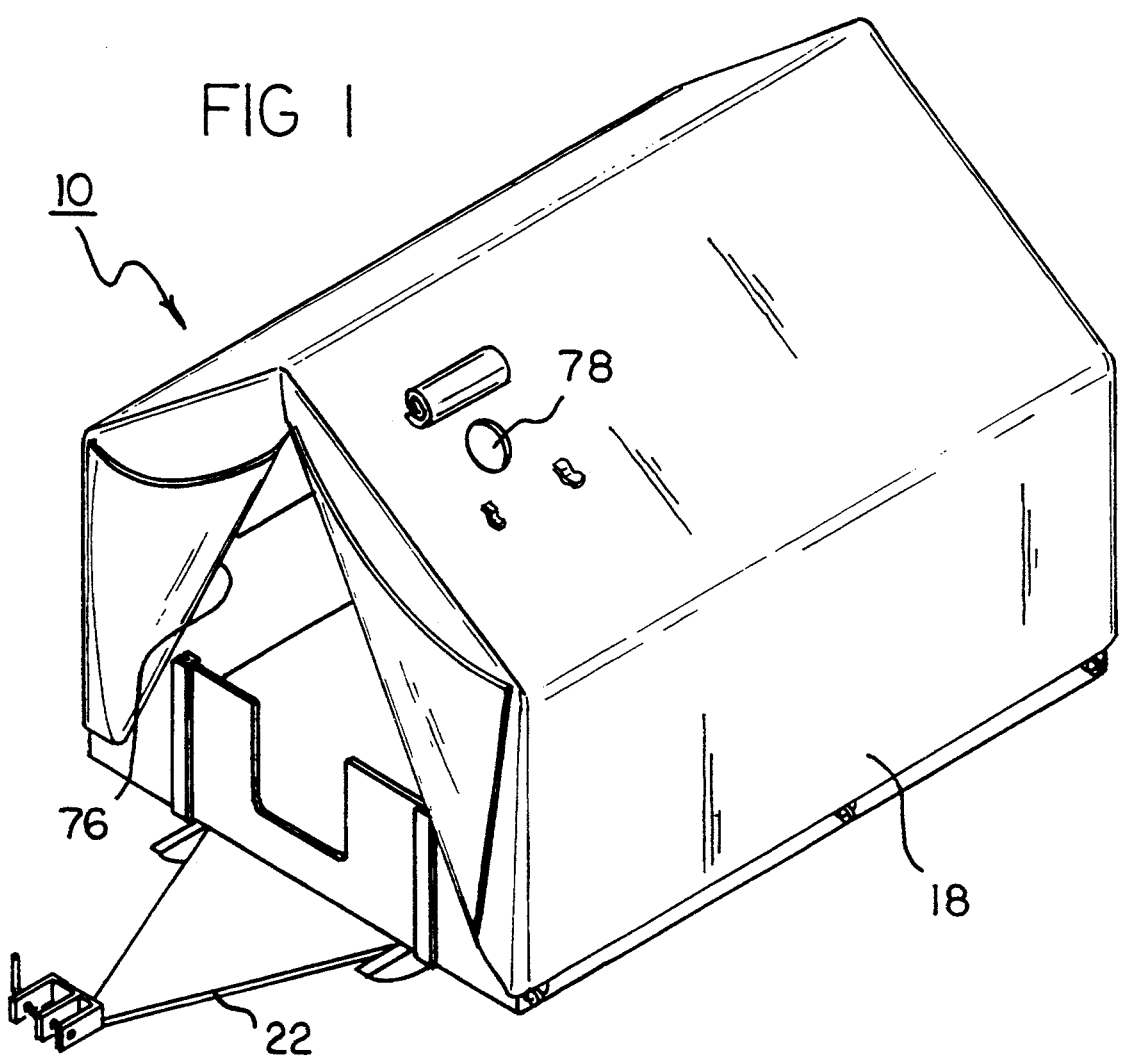
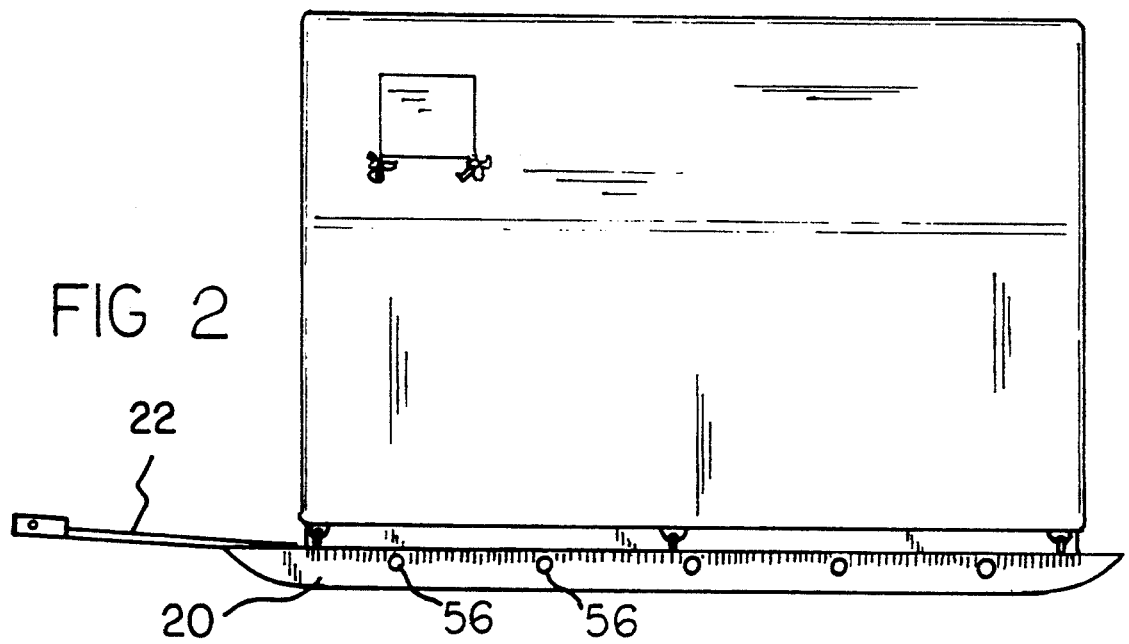

PORTABLE ICE FISHING HUT

BACKGROUND OF THE INVENTION

1. Field of the Invention

The present invention relates to a portable ice fishing hut and more particularly pertains to a hut formed of a base, frame, sheet material, a pair of skids and bracket, the hut being positionable in a collapsed orientation or deployed orientation and being transportable with in either orientation.

2. Description of the Prior Art

The use of portable ice fishing hut is known in the prior art. More specifically, portable ice fishing huts heretofore devised and utilized for the purpose of portable ice fishing huts are known to consist basically of familiar, expected and obvious structural configurations, notwithstanding the myriad of designs encompassed by the crowded prior art which have been developed for the fulfillment of countless objectives and requirements.

The prior art discloses a wide variety of structures for ice fishermen. Note, by way of example, U.S. Pat. No. 4,870,984 to Roth which discloses a portable shelter on skids but the shelter simply includes a bench and a cover for a part of the shelter.

U.S. Pat. No. 4,438,940 to Hunt discloses a combination sled and shelter device for use while ice fishing. This shelter completely surrounds the fishermen but its size is limited to a single fisherman.

Lastly, U.S. Pat. No. 4,926,893 to Klopfenstein discloses a portable collapsible ice fishing shelter with skids mounted perpendicular to the opening but being of a limited size does not disclose the folding of the base structure which is simply a single component.

In this respect, the portable ice fishing hut according to the present invention substantially departs from the conventional concepts and designs of the prior art, and in so doing provides an apparatus primarily developed for the purpose of convenient usage including transportation in either the collapsed or deployed orientations.

Therefore, it can be appreciated that there exists a continuing need for new and improved portable ice fishing hut which can be readily transported whether in a deployed or collapsed orientation. In this regard, the present invention substantially fulfills this need.

SUMMARY OF THE INVENTION

In view of the foregoing disadvantages inherent in the known types of portable ice fishing huts now present in the prior art, the present invention provides an improved portable ice fishing hut. As such, the general purpose of the present invention, which will be described subsequently in greater detail, is to provide a new and improved portable ice fishing hut and method which has all the advantages of the prior art devices and none of the disadvantages.

To attain this, the present invention essentially comprises a ice fish house readily transportable in either a collapsed orientation or a deployed orientation comprising, in combination, a housing base having a horizontal central platform with opposed parallel front and rear edges and opposed parallel side edges therebetween, a pair of similarly shaped side platforms each having an interior side edge and an exterior side edge and front and read parallel edges, parallel hinges coupling the side edges of the central platform and the interior edges of the side platforms with the side platforms being positionable between a deployed orientation wherein the side platforms extend in a horizontal plane with the central plane and a collapsed orientation wherein the side platforms extend upwardly at about 90 degrees with respect to the central platform, walls extending vertically from the exterior side edges and front and rear edges of the side platforms, and inserts removably positionable between the front and rear edges of the central platform and the walls of the front and rear edges when in the deployed orientation; a frame fabricated of vertical rods coupled at their lower edges to the exterior faces of the walls of the exterior edges, two parallel lengths of horizontal rods couplable to the upper edges of the vertical rods, a single horizontal length of rods centrally located between the lengths of horizontal rods but at an elevated location, a plurality of angled rods coupling the single length of rods and two parallel lengths of rods, and coupling elements separably joining the lengths of rods and the angled rods; sheet material covering the housing base and frame for forming an interior space therebetween; a pair of parallel skids positioned beneath the central platform, a plurality of holes through each skid in axially aligned pairs, a plurality of tubular housing coupling each axially aligned pair of holes, a support pole extending through each housing and extending axially therefrom a distance to support the side platforms when in the deployed orientation; and a bracket for pulling the base pivotally coupled at its rearward end to the forward end of the skis and having a hitch at its forward end for coupling with a vehicle.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved portable ice fishing hut which has all the advantages of the prior art devices and none of the disadvantages.

It is another object of the present invention to provide a new and improved portable ice fishing hut which may be easily and efficiently manufactured and marketed.

It is a further object of the present invention to provide a new and improved portable ice fishing hut which is of a durable and reliable construction.

An even further object of the present invention is to provide a new and improved portable ice fishing hut which is susceptible of a low cost of manufacture with regard to both materials and labor, and which accordingly is then susceptible of low prices of sale to the consuming public, thereby making such portable ice fishing huts economically available to the buying public.

Still yet another object of the present invention is to provide a new and improved portable ice fishing hut which provides in the apparatuses and methods of the prior art some of the advantages thereof, while simultaneously overcoming some of the disadvantages normally associated therewith.

Still another object of the present invention is to provide a new and improved ice fishing house readily transportable comprising, in combination a housing base having a horizontal central platform, a pair of similarly shaped side platforms, parallel hinges coupling the central platform and the side platforms with the side platforms being positionable between a deployed orientation wherein the side platforms extend in a horizontal plane with the central plane and a collapsed orientation wherein the side platforms extend upwardly at about 90 degrees with respect to the central platform, walls extending vertically from the side platforms; a frame fabricated of vertical rods coupled at their lower edges to the walls, two parallel lengths of horizontal rods couplable to the vertical rods, a single horizontal length of rods centrally located between the lengths of horizontal rods but at an elevated location, a plurality of angled rods coupling the single length of rods and two parallel lengths of rods, and coupling elements separably joining the lengths of rods and the angled rods; sheet material covering the housing base and frame for forming an interior space therebetween; and a pair of parallel skids positioned beneath the central platform, a plurality of holes through each skid in axially aligned pairs, a plurality of tubular housing coupling each axially aligned pair of holes, a support pole extending through each housing and extending axially therefrom a distance to support the side platforms when in the deployed orientation.

Yet another object of the present invention is to transport an ice fishing hut whether in the collapsed or deployed orientation.

Even still another object of the present invention is to enhance the enjoyment of ice fishing through an fishing hut which is portable whether in a collapsed or deployed orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of the portable ice fishing hut constructed in accordance with the principals of the present invention.

FIG. 2 is an elevational view of the portable ice fishing hut shown in FIG. 1.

DESCRIPTION OF THE PREFERRED EMBODIMENT

Figure 3:
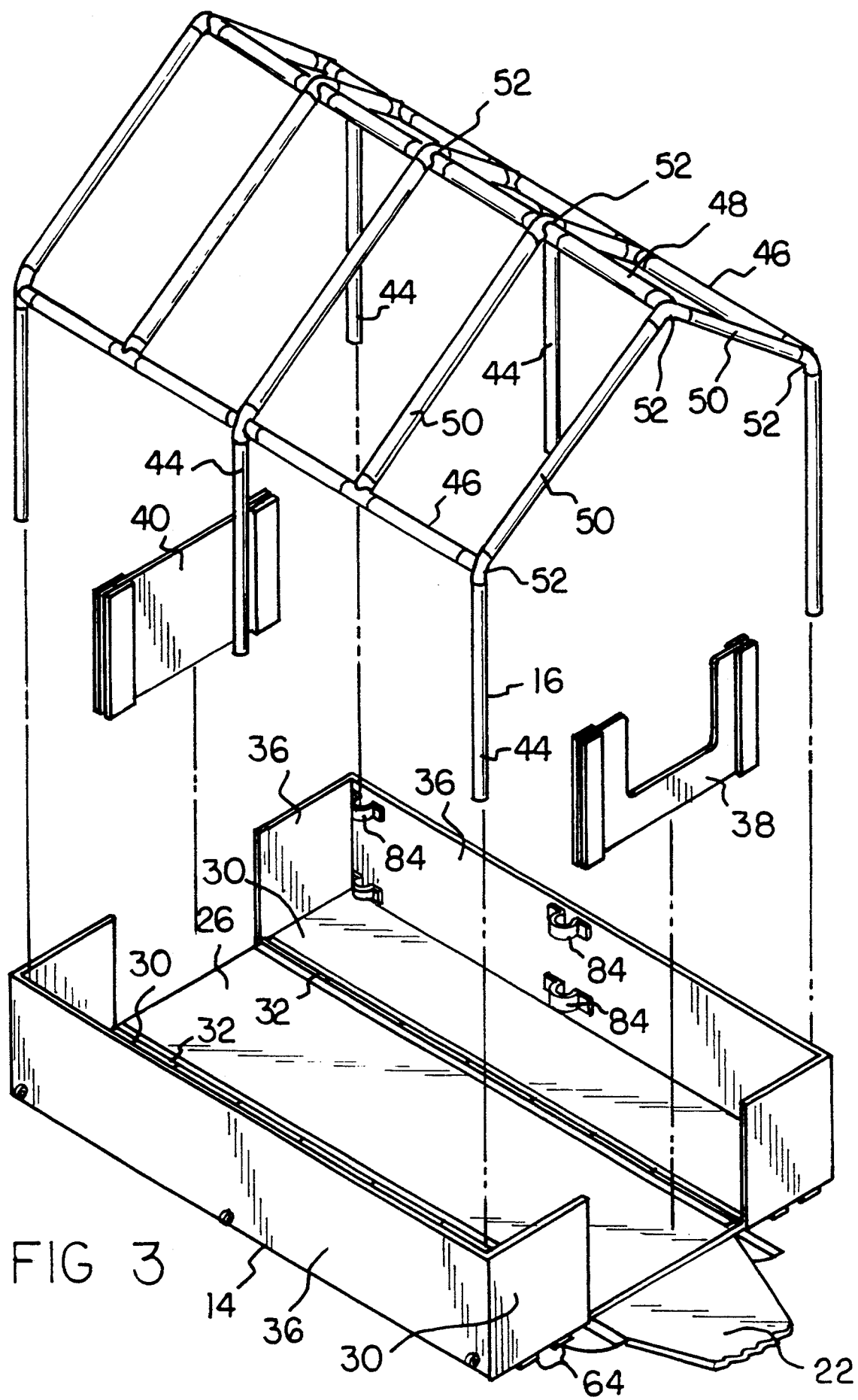
FIG. 3 is an exploded perspective illustration of the housing base in a deployed orientation, including its inserts, in combination with the frame, but without the sheet material covering it and also illustrating a forward portion of the skis and rearward portion of the bracket.
Figure 4:
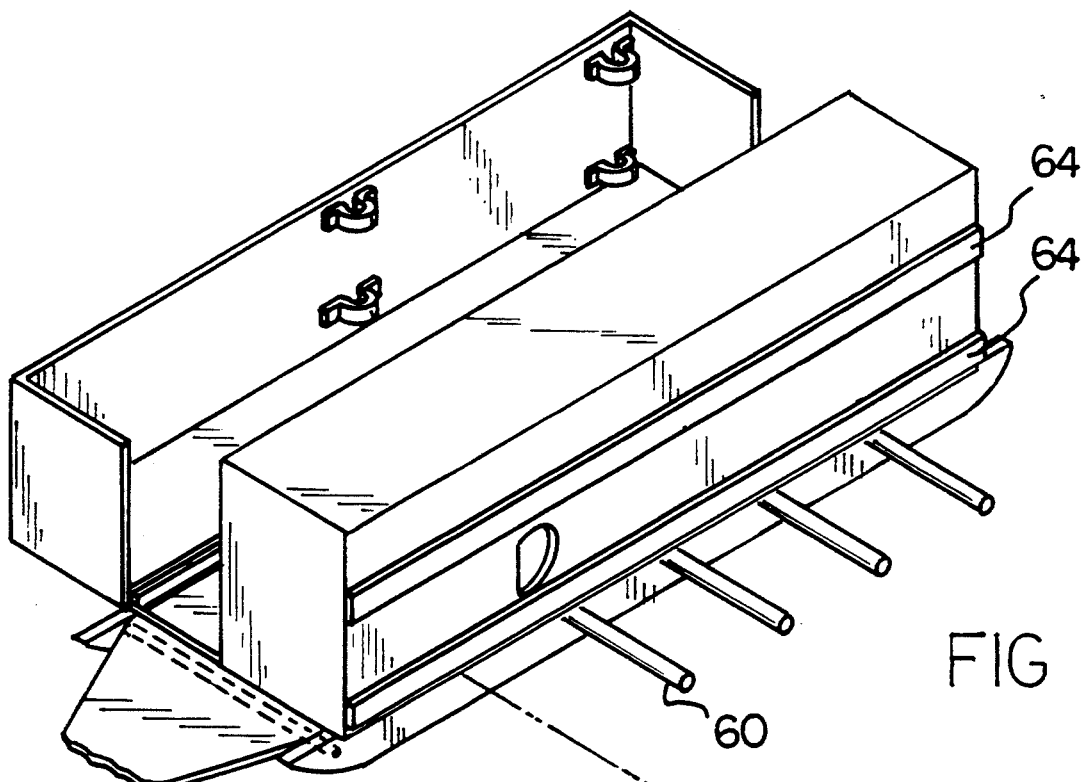
FIG. 4 is a perspective illustration of the housing base in a partially collapsed orientation to show the position of the support poles.

With reference now to the drawings, and in particular to FIG. 1 thereof, a new and improved portable ice fishing hut embodying the principles and concepts of the present invention and generally designated by the reference numeral 10 will be described.

Figure 5:
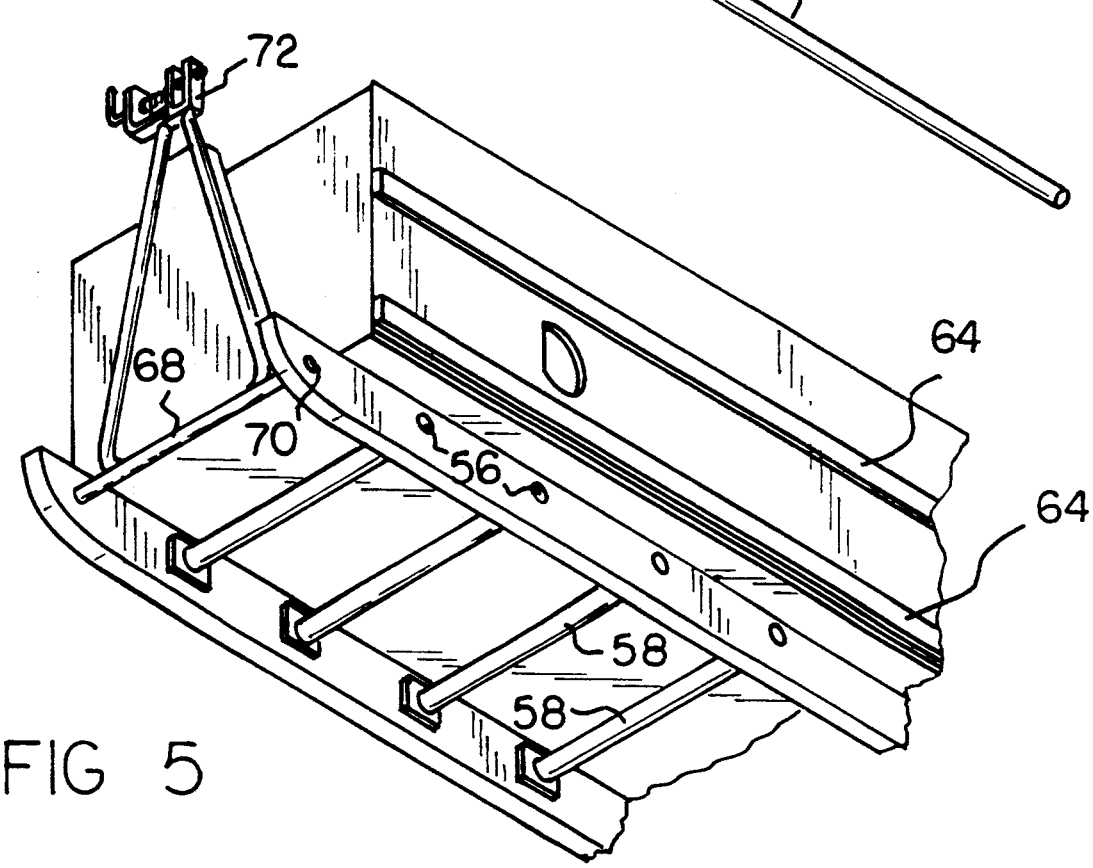
FIG. 5 is a bottom perspective view of the housing base when in the collapsed position and also illustrating the skids, pole housings and brackets.
Figure 6:
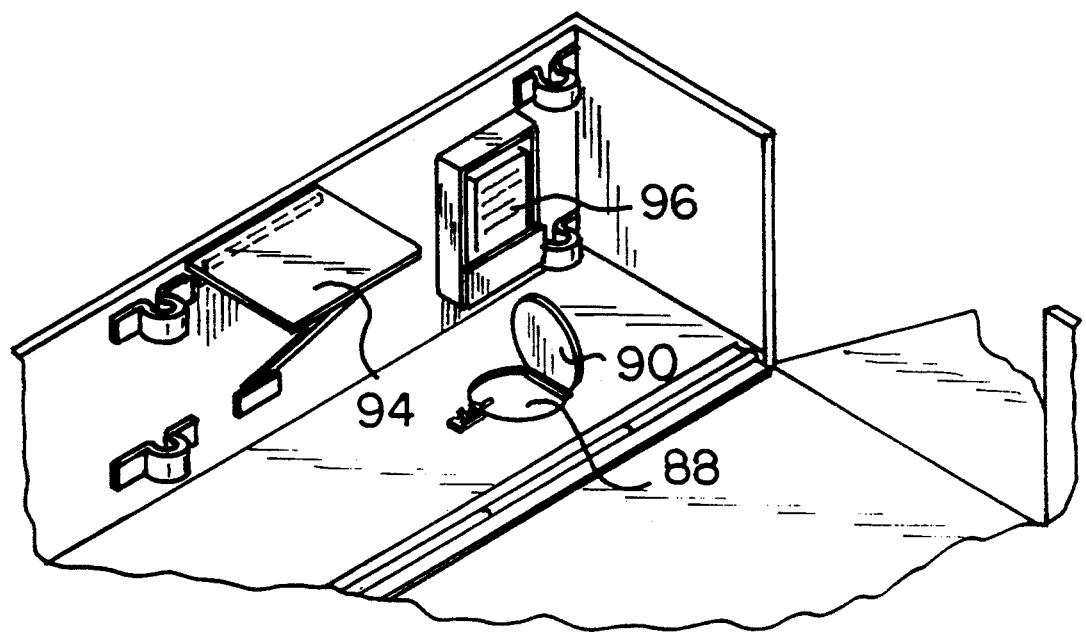
FIG. 6 is a perspective view of a portion of one of the side platforms and its adjacent walls with various components coupled thereto.
Figure 7:
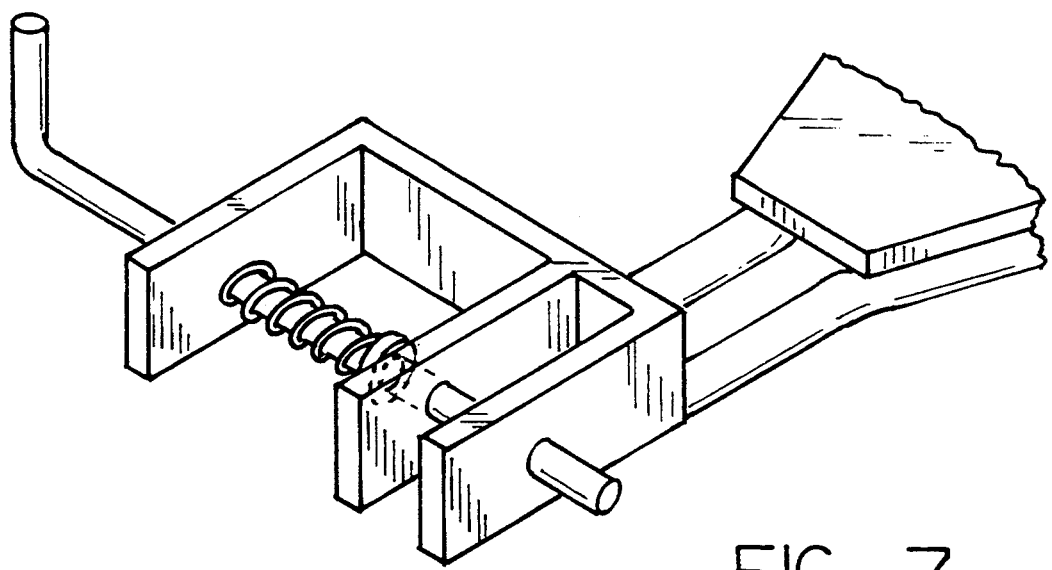
FIG. 7 is an enlarged perspective view of the leading edge of the bracket illustrating the mechanisms for coupling to a vehicle for being pulled.

More specifically, it will be noted that in FIGS. 1 and 3 there is shown components of the portable ice fishing hut or house 10 in the deployed orientation. As will be understood, the ice fishing house of the present invention is collapsible and readily transportable in either the collapsed orientation, FIG. 5, or the deployed orientation, FIG. 1. In general terms, the ice fishing house of the present invention includes five major components, the housing base 14, the frame 16, the sheet material 18, the pair of skids 20 and a bracket 22 for pulling the house.

The housing base 14 if formed to include a central platform 26 in a horizontal orientation. The central platform has parallel front and rear edges. It also has opposed parallel side edges between the front and rear edges.

A pair of slideably shaped side platforms 30 are provided. Each has in interior side edge and on parallel side edges in front and parallel front and rear edges.

The central and side platforms are coupled by parallel hinges 32, piano hinges are preferred as shown in the preferred embodiment. These hinges couple the side edges of the central platform and the interior edges of the side platform with the side platforms being positionable between a deployed orientation where the side panels extend into a horizontal plane parallel with the central plane. When in the collapsed orientation, the side platforms extend upwardly in about 90 degrees from the central platform.

In addition to the platforms, the housing base also includes vertically extending side walls 36 around three sides of the side platforms. In addition, a pair similarly configured inserts 38 and 40 are oriented with the first 38 located between the front edge and adjacent wall edges of the side platforms when in the deployed orientation. A similar insert 40 is positioned at the rear edge of the central platform between the front and rear edges of the central panel. The use of such inserts adds rigidity to the frame when in use and provides for a more secure interior.

The frame 16, the second component of the house is fabricated of vertical rods 44. The vertical rods 44 are coupled at their base to the lower ends of the interior faces of the walls of the exterior edge of the side platforms. Two lengths of horizontal rods 46 formed of coupled rod segments are couplable to the upper ends of the vertical rods. A single horizontal length of rod 48 is positioned centrally between the lengths of horizontal rods but at an elevated location. A plurality of angled rods 50 couple the single length of rod and the two parallel lengths of rods. Coupling elements 52 act to receive the ends of the various rods and rod segments for removably coupling such components whereby the frame structure might be positioned in a deployed orientation with an interior space therein. The various joints and coupling elements may be disassociated with the rods and lengths of rods when in the collapsed orientation and positioned within the collapsed housing. The rods are preferably formed of a strong but lightweight metal preferably aluminum. Steel or stainless steel might be used at an increase in cost but such add longevity to the hut. The rods and rod segments as well as the joints could readily be made of a plastic material such as polyvinyl chloride.

Sheet material 18 is used to cover the frame and housing base. Such may be of a single panel but preferably cut and stitched panel segments together. Such frame material covers the housing base and frame to form a space therein sufficient for a plurality of fishermen or visitors to stand up, walk around, sleep, or whatever while on a fishing trip.

A pair of skids 20 are positionable beneath the central platform 26. The skids include a plurality of holes 56 through each skid adjacent to the upper edge thereof and set out in axially aligned pairs. A plurality of tubular housings 58 couple each axially aligned pair of holes. Positionable within each housing when in the deployed orientation are support poles 60. The support poles 60 extend through each housing and extend axially a distance to support the side platforms when in the deplored orientation. In addition, elongated planks 64 are located on the lower surface of each side platform between the front and rear edges. These planks add height to the side platforms when supported on the poles extending through the housing to maintain the entire floor of the house at a common horizontal orientation.

The last component of the ice fishing house is a bracket 22. The bracket functions for pulling the house by the housing base from location to location whether in the deplored orientation or the collapsed orientation. The bracket is of a triangular configuration with the base pivotably secured through a pole 68 through holes 70 at the forward ends of the skis. The forward end of the bracket is provided with a hitch 72 at its forward end for coupling with a vehicle during transportation, whether the vehicle is a truck, snowmobile or the like. When being transported in the collapsed orientation all of the component elements may be disassembled and placed on the floor on the central platform with the side platforms pivoted upwardly to be enclosed therein for safety. The hitch preferably includes a spring loaded pin for securing the leading edge of the bracket to the pulling vehicle in the conventional manner.

The fishing hut has several additional features which add to its utility. For example, the sheet material 18 has a vertically extending opening 76 extending upwardly from the center of the front edge of the central platform for entering and leaving the interior space. Also included is a vent hole 78 in the sheet material with a flap 80 positionable in a rolled orientation to open the vent and an extended orientation to cover the vent.

Other features include brackets 84 on the interior face of the parallel side walls for receiving the lower ends of the vertical rods. In addition, a hole 88 is provided in at least one of the side platforms with a cover 90 movable between an open position and a closed position for fishing purposes. Also preferably provided is a shelf 94 pivotally coupled to at least one of the side walls. Lastly, a heater 96 is preferably positioned on one of the side walls.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An ice fish house readily transportable in either a collapsed orientation or a deployed orientation comprising, in combination:

a housing base having a horizontal central platform with opposed parallel front and rear edges and opposed parallel side edges therebetween, a pair of similarly shaped side platforms each having an interior side edge and an exterior side edge and front and rear parallel edges parallel hinges coupling the side edges of the central platform and the interior edges of the side platforms with the side platforms being positionable between a deployed orientation wherein the side platforms extend in a horizontal plane with the central plane and a collapsed orientation wherein the side platforms extend upwardly at about 90 degrees with respect to the central platform, walls extending vertically from the exterior side edges and front and rear edges of the side platforms, and inserts removably positionable between the front and rear edges of the central platform and the walls of the front and rear edges when in the deployed orientation;

a frame fabricated of vertical rods coupled at their lower edges to the exterior faces of the walls of the exterior edges, two parallel lengths of horizontal rods couplable to the upper edges of the vertical rods, a single horizontal length of rods centrally located between the lengths of horizontal rods but at an elevated location, a plurality of angled rods coupling the single length of rods and two parallel lengths of rods, and coupling elements separably joining the lengths of rods and the angled rods;

sheet material covering the housing base and frame for forming an interior space therebetween;

a pair of parallel skids positioned beneath the central platform, a plurality of holes through each skid in axially aligned pairs, a plurality of tubular housing coupling each axially aligned pair of holes, a support pole extending through each housing and extending axially therefrom a distance to support the side platforms when in the deployed orientation; and a bracket for pulling the base pivotally coupled at its rearward end to the forward end of the skis and having a hitch at its forward end for coupling with a vehicle.

2. An ice fish house readily transportable comprising, in combination:

a housing base having a horizontal central platform, a pair of similarly shaped side platforms, parallel hinges coupling the central platform and the side platforms with the side platforms being positionable between a deployed orientation wherein the side platforms extend in a horizontal plane with the central plane and a collapsed orientation wherein the side platforms extend upwardly at about 90 degrees with respect to the central platform, walls extending vertically from the side platforms;

a frame fabricated of vertical rods coupled at their lower edges to the walls, two parallel lengths of horizontal rods couplable to the vertical rods, a single horizontal length of rods centrally located between the lengths of horizontal rods but at an elevated location, a plurality of angled rods coupling the single length of rods and two parallel lengths of rods, and coupling elements separably joining the lengths of rods and the angled rods;

sheet material covering the housing base and frame for forming an interior space therebetween; and a pair of parallel skids positioned beneath the central platform, a plurality of holes through each skid in axially aligned pairs, a plurality of tubular housing coupling each axially aligned pair of holes, a support pole extending through each housing and extending axially therefrom a distance to support the side platforms when in the deployed orientation.

3. The apparatus as set forth in claim 2 wherein the sheet material has a vertically extending opening extending upwardly from the central platform for entering and leaving the interior space.

4. The apparatus as set forth in claim 2 and further including a vent hole in the sheet material with a flap positionable into a rolled orientation to open the vent and an extended orientation to cover the vent.

5. The apparatus as set forth in claim 2 and further including brackets on the parallel side walls for receiving the lower ends of the vertical rods.

6. The apparatus as set forth in claim 2 and further including a hole in at least one of the side platforms with a cover movable between an open position and a closed position.

7. The apparatus as set forth in claim 2 and further including a shelf pivotally coupled to at least one of the side walls.

8. The apparatus as set forth in claim 2 and further including a heater positioned on one of the side walls.

* * * * *